(12) United States Patent
Okutsu et al.

(10) Patent No.: US 7,964,001 B2
(45) Date of Patent: Jun. 21, 2011

(54) FUEL MANAGEMENT SYSTEMS HAVING A FLUORORUBBER ARTICLE IN CONTACT WITH BIODIESEL FUEL

(75) Inventors: Shuichi Okutsu, Kamakura (JP); Bunichi Rai, Tokyo (JP)

(73) Assignee: DuPont Performance Elastomers L.L.C., Wilmington, DE (US)

( * ) Notice: Subject to any disclaimer, the term of this patent is extended or adjusted under 35 U.S.C. 154(b) by 272 days.

(21) Appl. No.: 12/423,100

(22) Filed: Apr. 14, 2009

(65) Prior Publication Data

US 2010/0261849 A1  Oct. 14, 2010

(51) Int. Cl.
*C10L 1/19* (2006.01)
(52) U.S. Cl. .......................................... 44/308; 44/456
(58) Field of Classification Search ............... 44/308, 44/456
See application file for complete search history.

(56) References Cited

U.S. PATENT DOCUMENTS

| | | |
|---|---|---|
| 7,098,270 B2 | 8/2006 | Hochgesang et al. |
| 7,431,991 B2 | 10/2008 | Verschuere et al. |
| 2008/0276524 A1* | 11/2008 | Fuller .............................. 44/308 |
| 2009/0032475 A1* | 2/2009 | Ferrer et al. .................. 210/799 |
| 2011/0014478 A1* | 1/2011 | Sagisaka et al. .............. 428/421 |

FOREIGN PATENT DOCUMENTS

EP  0691371 A1  1/1996

OTHER PUBLICATIONS

A. Neppel, M. V. Kuzenko, J. Guttenberger, Swelling of Fluoroelastomers in Synthetic Lubricants, Rubber Chemistry and Technology, 1982, pp. 12-20, vol. 56, Wehrwissenschaftliches Institut for Materialuntersuchungen, Erding, Federal Republic of Germany.

* cited by examiner

*Primary Examiner* — Bernard Lipman

(57) ABSTRACT

Disclosed herein is a fuel management system having at least one fluororubber article in contact with biodiesel fuel wherein said fluororubber article comprises i) a polyhydroxy cured fluoroelastomer comprising copolymerized units of vinylidene fluoride and at least one other fluoromonomer, and ii) 1 to 10 parts by weight of a diester of a dicarboxylic acid per hundred parts fluoroelastomer. Also disclosed is a method for reducing volume swell of a polyhydroxy cured fluororubber article in contact with biodiesel fuel wherein 1 to 10 parts by weight of a diester of a dicarboxylic acid is incorporated into said article.

16 Claims, No Drawings

FUEL MANAGEMENT SYSTEMS HAVING A FLUORORUBBER ARTICLE IN CONTACT WITH BIODIESEL FUEL

FIELD OF THE INVENTION

This invention relates to fuel management systems having at least one fluororubber article in contact with biodiesel fuel wherein said fluororubber article comprises i) a polyhydroxy cured fluoroelastomer and ii) 1 to 10 parts by weight of a diester of a dicarboxylic acid per hundred parts fluoroelastomer.

BACKGROUND OF THE INVENTION

Fluoroelastomers having excellent heat resistance, oil resistance, and chemical resistance have been used widely for sealing materials, containers and hoses. Examples of fluoroelastomers include copolymers comprising units of vinylidene fluoride ($VF_2$) and units of at least one other copolymerizable fluorine-containing monomer such as hexafluoropropylene (HFP), tetrafluoroethylene (TFE), chlorotrifluoroethylene (CTFE), vinyl fluoride (VF), and a fluorovinyl ether such as a perfluoro(alkyl vinyl ether) (PAVE). Specific examples of PAVE include perfluoro(methyl vinyl ether), perfluoro(ethyl vinyl ether) and perfluoro(propyl vinyl ether).

In order to fully develop physical properties such as tensile strength, elongation, and compression set, elastomers must be cured, i.e. vulcanized or crosslinked. In the case of fluoroelastomers, this is generally accomplished by mixing uncured polymer (i.e. fluoroelastomer gum) with a polyfunctional curing agent and heating the resultant mixture, thereby promoting chemical reaction of the curing agent with active sites along the polymer backbone or side chains. Interchain linkages produced as a result of these chemical reactions cause formation of a crosslinked polymer composition having a three-dimensional network structure. Commonly employed curing agents for fluoroelastomers include difunctional nucleophilic reactants, such as polyhydroxy compounds.

However, polyhydroxy cured fluoroelastomer articles may exhibit unacceptably high volume swell, e.g. 50-200 vol. %, that can lead to seal failure, when seals are exposed to biodiesel fuel for long periods of time or at elevated temperatures, especially when the fuel contains a minor amount of water. Biodiesel fuels often contain water as an impurity. The source of the water may be a washing step in the fuel manufacturing process or exposure to moist air during storage. Typical specifications for manufactured biodiesel allow for some water impurity, e.g. ASTM D6751.

SUMMARY OF THE INVENTION

In one aspect, the present invention provides a fuel management system having at least one fluororubber article in contact with biodiesel wherein said fluororubber article has excellent (i.e. low) volume swell in biodiesel fuel. Said fluororubber article comprises i) at least one polyhydroxy cured fluoroelastomer and ii) 1 to 10 parts by weight, per hundred parts fluoroelastomer, of at least one diester of a dicarboxylic acid having the formula $R(COOR')_2$ wherein R is an alkylene group having 2 to 10 carbon atoms and R' is an alkyl group having 1 to 6 carbon atoms.

Another aspect of the invention is a method for reducing the volume swell of a polyhydroxy cured fluororubber article in contact with biodiesel fuel wherein 1 to 10 parts by weight, per hundred parts by weight fluoroelastomer, of at least one diester of a dicarboxylic acid is incorporated into a polyhydroxy curable fluoroelastomer composition prior to curing said composition, said diester of a dicarboxylic acid having the formula $R(COOR')_2$ wherein R is an alkylene group having 2 to 10 carbon atoms and R' is an alkyl group having 1 to 6 carbon atoms.

DETAILED DESCRIPTION OF THE INVENTION

The present invention is directed to fuel management systems having at least one fluororubber article in contact with biodiesel fuel. The fluororubber article comprises at least one polyhydroxy cured fluoroelastomer and 1 to 10 parts by weight, per hundred parts by weight fluoroelastomer (1 to 10 phr), of at least one diester of a dicarboxylic acid having the formula $R(COOR')_2$ wherein R is an alkylene group having 2 to 10 carbon atoms and R' is an alkyl group having 1 to 6 carbon atoms. Such fluororubber articles have surprisingly low volume swell, i.e. less than 10 vol. %, preferably less than 5 vol. %, when exposed to biodiesel fuel for long periods of time and/or at elevated temperatures.

Specific examples of diesters of dicarboxylic acids that may be employed in this invention include, but are not limited to diisobutyl adipate, dimethyl adipate, diisobutyl pimelate, diisobutyl glutarate, di-n-butyl sebacate and mixtures thereof. Diisobutyl esters are preferred.

By the term "fuel management system" is meant equipment employed in the manufacture, storage, transportation and supply, metering and control of biodiesel fuel. Fuel management systems include those contained in biodiesel manufacturing plants, motor vehicles (e.g. trucks, cars, boats), stationary diesel powered devices (e.g. electrical generators, portable pumping stations) and those associated with biodiesel fuel transportation, storage and dispensing. Specific elements of fuel management systems include, but are not limited to fuel tanks, filler neck hoses, fuel tank cap seals, fuel line hoses and tubing, valves, diaphragms and fuel injector components, o-rings, seals and gaskets. Any or all of these elements may comprise one or more fluororubber articles that contact biodiesel fuel.

By "biodiesel fuel" is meant a fuel suitable for use in a compression ignition (diesel) engine compromising one or more fatty acid alkyl esters (FAAE) of biological origin (i.e. derived from animals or plants). These FAAEs are typically methyl or ethyl esters of fatty acids derived from vegetable oils or animal fats. Specific examples include rape seed oil methyl ester (RME), soybean oil methyl ester (SME), palm kernel oil methyl ester (PME) and the like. Also included are blends of these FAAE based materials with conventional petroleum based diesel fuel. Petroleum diesel/biodiesel blends are conventionally denoted as Bxx fuels where "xx" is the volume percent of the FAAE based biodiesel in the blend. For example, B100 denotes a biodiesel fuel containing no deliberately added petroleum component. B20 denotes biodiesel fuel containing 20 vol. % of a B100 fuel and 80 vol. % of petroleum diesel fuel.

Fluororubber articles employed in this invention include, but are not limited to seals, gaskets, o-rings, tubing, the fuel contact layer of multilayer hoses, valve packings, diaphragms, and tank liners.

Fluoroelastomers that are suitable for use in this invention are those that are polyhydroxy curable. By "polyhydroxy curable" is meant fluoroelastomers which are known to crosslink with polyhydroxy curatives such as bisphenol AF. Such fluoroelastomers include those having a plurality of carbon-carbon double bonds along the main elastomer polymer chain and also fluoroelastomers which contain sites that may be readily dehydrofluorinated. The latter fluoroelastomers include, but are not limited to those which contain adjacent copolymerized units of vinylidene fluoride (VF$_2$) and hexafluoropropylene (HFP) as well as fluoroelastomers which contain adjacent copolymerized units of VF$_2$ (or tetrafluoroethylene) and a fluorinated comonomer having an acidic hydrogen atom such as 2-hydropentafluoropropylene; 1-hydropentafluoropropylene; trifluoroethylene; 2,3,3,3-tetrafluoropropene; or 3,3,3-trifluoropropene. Preferred fluoroelastomers include the copolymers of i) vinylidene fluoride with hexafluoropropylene and, optionally, tetrafluoroethylene (TFE); ii) vinylidene fluoride with a perfluoro(alkyl vinyl ether) such as perfluoro(methyl vinyl ether), 2-hydropentafluoropropylene and optionally, tetrafluoroethylene; iii) tetrafluoroethylene with propylene and 3,3,3-trifluoropropene; iv) tetrafluoroethylene, perfluoro(methyl vinyl ether) and hexafluoro-2-(pentafluorophenoxy)-1-(trifluorovinyloxy) propane, and v) ethylene with tetrafluoroethylene, perfluoro (methyl vinyl ether) and 3,3,3-trifluoropropylene.

In addition to the fluoroelastomer and diester of a dicarboxylic acid, curable compositions employed to make the cured fluororubber articles of this invention contain a polyhydroxy cure system, meaning a polyhydroxy curative, an acid acceptor and a vulcanization (or curing) accelerator.

The curable compositions contain 0.4 to 4 parts by weight (preferably 1 to 2.5 parts) of polyhydroxy crosslinking agent (or a derivative thereof) per 100 parts by weight fluoroelastomer, i.e. 0.4-4 phr (preferably 1-2.5 phr). Typical polyhydroxy cross-linking agents include di-, tri-, and tetrahydroxybenzenes, naphthalenes, and anthracenes, and bisphenols of the formula

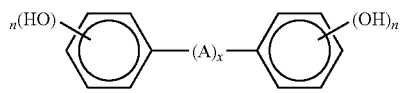

where A is a difunctional aliphatic, cycloaliphatic, or aromatic radical of 1-13 carbon atoms, or a thio, oxy, carbonyl, sulfinyl, or sulfonyl radical; A may optionally be substituted with at least one chlorine or fluorine atom; x is 0 or 1; n is 1 or 2; and any aromatic ring of the polyhydroxylic compound may optionally be substituted with at least one chlorine or fluorine atom, an amino group, a —CHO group, or a carboxyl or acyl radical. Preferred polyhydroxy compounds include hexafluoroisopropylidene-bis(4-hydroxy-benzene) (i.e. bisphenol AF or BPAF); 4,4'-isopropylidene diphenol (i.e. bisphenol A); 4,4'-dihydroxydiphenyl sulfone; and diaminobisphenol AF. Referring to the bisphenol formula shown above, when A is alkylene, it can be for example methylene, ethylene, chloroethylene, fluoroethylene, difluoroethylene, propylidene, isopropylidene, tributylidene, heptachlorobutylidene, hepta-fluorobutylidene, pentylidene, hexylidene, and 1,1-cyclohexylidene. When A is a cycloalkylene radical, it can be for example 1,4-cyclohexylene, 2-chloro-1,4-cyclohexylene, cyclopentylene, or 2-fluoro-1,4-cyclohexylene. Further, A can be an arylene radical such as m-phenylene, p-phenylene, o-phenylene, methylphenylene, dimethylphenylene, 1,4-naphthylene, 3-fluoro-1,4-naphthylene, and 2,6-naphthylene. Polyhydroxyphenols of the formula

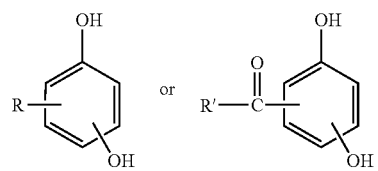

where R is H or an alkyl group having 1-4 carbon atoms or an aryl group containing 6-10 carbon atoms and R' is an alkyl group containing 1-4 carbon atoms also act as effective crosslinking agents. Examples of such compounds include hydroquinone, catechol, resorcinol, 2-methylresorcinol, 5-methyl-resorcinol, 2-methylhydroquinone, 2,5-dimethylhydroquinone, 2-t-butyl-hydroquinone; and such compounds as 1,5-dihydroxynaphthalene and 2,6-dihydroxynaphthalene.

Additional polyhydroxy curing agents include alkali metal salts of bisphenol anions, quaternary ammonium salts of bisphenol anions, tertiary sulfonium salts of bisphenol anions and quaternary phosphonium salts of bisphenol anions. For example, the salts of bisphenol A and bisphenol AF. Specific examples include the disodium salt of bisphenol AF, the dipotassium salt of bisphenol AF, the monosodium monopotassium salt of bisphenol AF and the benzyltriphenylphosphonium salt of bisphenol AF.

Quaternary ammonium and phosphonium salts of bisphenol anions are discussed in U.S. Pat. Nos. 4,957,975 and 5,648,429. Bisphenol AF salts (1:1 molar ratio) with quaternary ammonium ions of the formula $R_1R_2R_3R_4N^+$, wherein $R_1$-$R_4$ are $C_1$-$C_8$ alkyl groups and at least three of $R_1$-$R_4$ are $C_3$ or $C_4$ alkyl groups are preferred. Specific examples of these preferred compositions include the 1:1 molar ratio salts of tetrapropyl ammonium-, methyltributylammonium- and tetrabutylammonium bisphenol AF. Such salts may be made by a variety of methods. For instance a methanolic solution of bisphenol AF may be mixed with a methanolic solution of a quaternary ammonium salt, the pH is then raised with sodium methoxide, causing an inorganic sodium salt to precipitate. After filtration, the tetraalkylammonium/BPAF salt may be isolated from solution by evaporation of the methanol. Alternatively, a methanolic solution of tetraalkylammonium hydroxide may be employed in place of the solution of quaternary ammonium salt, thus eliminating the precipitation of an inorganic salt and the need for its removal prior to evaporation of the solution.

In addition, derivatized polyhydroxy compounds such as mono- or diesters, and trimethylsilyl ethers are useful crosslinking agents. Examples of such compositions include, but are not limited to resorcinol monobenzoate, the diacetate of bisphenol AF, the diacetate of sulfonyl diphenol, and the diacetate of hydroquinone.

The curable compositions employed to make the cured fluororubber articles of the invention also contain between 1 to 60 parts by weight (preferably 4 to 40 parts) of at least one acid acceptor per 100 parts fluoroelastomer. The acid acceptor is typically a strong organic base such as Proton Sponge® (available from Aldrich) or an oxirane, or an inorganic base such as a metal oxide, metal hydroxide, a hydrotalcite, or a mixture of 2 or more of the latter. Metal oxides or hydroxides which are useful acid acceptors include calcium hydroxide, magnesium oxide, lead oxide, zinc oxide and calcium oxide. Calcium hydroxide and magnesium oxide are preferred.

Vulcanization accelerators (also referred to as cure accelerators) which may be used in the curable fluoroelastomer compositions include tertiary sulfonium salts such as

[(C₆H₅)₂S⁺(C₆H₁₃)][Cl]⁻, and [(C₆H₁₃)₂S(C₆H₅)]⁺[CH₃CO₂]⁻ and quaternary ammonium, phosphonium, arsonium, and stibonium salts of the formula $R_5R_6R_7R_8Y^+\ X^-$, where Y is phosphorous, nitrogen, arsenic, or antimony; $R_5$, $R_6$, $R_7$, and $R_8$ are individually $C_1$-$C_{20}$ alkyl, aryl, aralkyl, alkenyl, and the chlorine, fluorine, bromine, cyano, —OR, and —COOR substituted analogs thereof, with R being $C_1$-$C_{20}$ alkyl, aryl, aralkyl, alkenyl, and where X is halide, hydroxide, sulfate, sulfite, carbonate, pentachlorothiophenolate, tetrafluoroborate, hexafluorosilicate, hexafluorophosphate, dimethyl phosphate, and $C_1$-$C_{20}$ alkyl, aryl, aralkyl, and alkenyl carboxylates and dicarboxylates. Particularly preferred are benzyltri-phenylphosphonium chloride, benzyltriphenylphosphonium bromide, tetrabutylammonium hydrogen sulfate, tetrabutylammonium hydroxide, tetrapropylammonium hydroxide, tetrabutylammonium bromide, tributylallylphosphonium chloride, tributyl-2-methoxypropylphosphonium chloride, 1,8-diazabicyclo[5.4.0]undec-7-ene, and benzyldiphenyl(dimethylamino) phosphonium chloride. Other useful accelerators include methyltrioctylammonium chloride, methyltributylammonium chloride, tetrapropylammonium chloride, benzyltrioctylphosphonium bromide, benzyltrioctylphosphonium chloride, methyltrioctylphosphonium acetate, tetraoctylphosphonium bromide, methyltriphenylarsonium tetrafluoroborate, tetraphenylstibonium bromide, 4-chlorobenzyltriphenyl phosphonium chloride, 8-benzyl-1,8-diazabicyclo(5.4.0)-7-undecenonium chloride, diphenylmethyltriphenylphosphonium chloride, allyltriphenyl-phosphonium chloride, tetrabutylphosphonium bromide, m-trifluoromethyl-benzyltrioctylphosphonium chloride, and other quaternary compounds disclosed in U.S. Pat. Nos. 5,591,804; 4,912,171; 4,882,390; 4,259,463; 4,250,278 and 3,876,654. The amount of accelerator used is between 0.05 and 2 parts by weight per hundred parts by weight fluoroelastomer (0.05-2 phr). Preferably, 0.1 to 1.0 parts accelerator per hundred parts fluoroelastomer is used.

The fluoroelastomer, polyhydroxy curative, cure accelerator, acid acceptor, diester of a dicarboxylic acid, and any other ingredients are generally incorporated into a curable composition by means of an internal mixer or rubber mill. The resulting composition may then be shaped (e.g. molded or extruded) and cured to form a fluororubber article. Curing typically takes place at about 150°-200° C. for 1 to 60 minutes. Conventional rubber curing presses, molds, extruders, and the like provided with suitable heating and curing means can be used. Also, for optimum physical properties and dimensional stability, it is preferred to carry out a post curing operation wherein the molded or extruded fluororubber article is heated in an oven or the like for an additional period of about 1-48 hours, typically from about 180°-275° C., generally in an air atmosphere.

Another aspect of the present invention is a method for reducing the volume swell of polyhydroxy cured fluororubber articles in biodiesel fuel wherein 1 to 10 phr of at least one of the above-defined diesters of a dicarboxylic acid is incorporated into a polyhydroxy curable fluoroelastomer composition prior to curing the composition. Fluororubber articles produced by this method have volume swells less than 10 vol. %, preferably less than 5 vol. %, when exposed to biodiesel fuel (SME 20 (20 vol. % soy methyl ester/80 vol. % petroleum diesel) with 3300 ppm water, 30 ppm formic acid, 20 ppm acetic acid, 10 ppm propionic acid, 35 ppm sulfuric acid and 1 ppm butyric acid ) at 120° C. for 672 hours.

EXAMPLES

Test Methods

Tensile Properties

The following physical property parameters were recorded prior to exposure to biodiesel fuel; test methods are in parentheses:

$T_b$: tensile strength, MPa (ASTM D412-92)
$E_b$: elongation at break, % (ASTM D412-92)
M100: modulus at 100% elongation, MPa (ASTM D412-92).
Hardness, Shore A (ASTM D412-92)

Volume Swell (%) after immersion in biodiesel was determined by ASTM D471-96 on standard ASTM D471 coupons. The coupons were prepared from cured fluororubber slabs and immersed in biodiesel fuel in a sealed Parr vessel at 120° C. for the times noted in the Examples. Fuel was replaced with fresh fuel on a weekly basis.

The invention is further illustrated by, but is not limited to, the following examples.

Fluoroelastomer (FKM1) employed in the examples was contained in a precompound comprising 1) 97.3 parts by weight of a copolymer of vinylidene fluoride, hexafluoropropylene and tetrafluoroethylene, 2) 2.5 parts by weight of a salt of bisphenol AF and benzyltriphenylphosphonium chloride, and 3) 0.2 parts by weight of tetrabutylammonium bromide.

Diesters of dicarboxylic acids employed in the examples were

Diester1: The diisobutyl ester of a mixture of glutaric acid, adipic acid and pimelic acid.
Diester2: Diisobutyl adipate
Diester3: Dimethyl adipate
Diester4: Diisobutyl glutarate
Diester5: Di-n-butyl sebacate Biodiesel fuel employed in the examples was a mixture of SME 20 (20 vol. % soy methyl ester/80 vol. % petroleum diesel) with 3300 ppm water, 30 ppm formic acid, 20 ppm acetic acid, 10 ppm propionic acid, 35 ppm sulfuric acid and 1 ppm butyric acid. All ppm are by weight, based on total weight of the fuel.

Examples 1-6 and Comparative Example A

Curable compositions for Examples 1-6 and Comparative Example A were made by compounding the ingredients in an internal laboratory mixer and sheet off mill. Formulations are shown in Table I.

The compositions were molded into slabs (for tensile testing and volume swell testing) and pellets (for compression set testing) and press cured at 160° C. for 15 minutes (slabs) 25 minutes (pellets). Tensile properties and compression set were measured according to the Test Methods and are also shown in Table I.

Coupons made from cured slabs were exposed to the above-described biodiesel fuel. Results are shown in Table I. Fluororubber coupons that did not contain any dicarboxylic acid diester (Comparative Example A) exhibited high volume swell (98 vol. % after 168 hours, 137 vol. % after 672 hours) and also are large change in hardness (−26 and −39, respectively). However, coupons that were made from fluororubber of the invention, containing various levels of dicarboxylic acid diester, exhibited low swell (<4 vol. % after both 137 and 672 hours) and only a small change in hardness (<5).

TABLE I

| Ingredient, phr[1] | Comp. Ex. A | Ex. 1 | Ex. 2 | Ex. 3 | Ex. 4 | Ex. 5 | Ex. 6 |
|---|---|---|---|---|---|---|---|
| FKM1 | 100 | 100 | 100 | 100 | 100 | 100 | 100 |
| SRF 50[2] | 15 | 15 | 15 | 15 | 15 | 15 | 15 |
| Ca(OH)$_2$ | 6 | 6 | 6 | 6 | 6 | 6 | 6 |
| MgO[3] | 3 | 3 | 3 | 3 | 3 | 3 | 3 |
| Diester1 | 0 | 1.5 | 3 | 0 | 0 | 0 | 0 |
| Diester2 | 0 | 0 | 0 | 3 | 0 | 0 | 0 |
| Diester3 | 0 | 0 | 0 | 0 | 3 | 0 | 0 |
| Diester4 | 0 | 0 | 0 | 0 | 0 | 3 | 0 |
| Diester5 | 0 | 0 | 0 | 0 | 0 | 0 | 3 |
| Tensile Properties: | | | | | | | |
| Hardness, Shore A | 70 | 70 | 64 | 64 | 68 | 70 | 65 |
| M100, MPa | 3.0 | 3.4 | 3.2 | 3.2 | 3.4 | 3.5 | 3.1 |
| Tb, MPa | 11.8 | 10.0 | 9.9 | 10.1 | 10.6 | 10.9 | 10.8 |
| Eb, % | 350 | 350 | 330 | 350 | 350 | 350 | 381 |
| Compression Set, 70 hours @100° C., % | 35 | 42 | 42 | 42 | 41 | 39 | 42 |
| Volume Swell, 168 hours, vol. % | 98 | 1 | −2 | −1 | 0 | 0 | −1 |
| Change in hardness, 168 hours, Shore A | −26 | −1 | 4 | 4 | 0 | −2 | 4 |
| Volume Swell, 672 hours, vol. % | 137 | 3 | −1 | 0 | 1 | 1 | −1 |
| Change in hardness, 672 hours, Shore A | −39 | −1 | 3 | 4 | −3 | −2 | 3 |

[1]parts by weight per hundred parts rubber (i.e. fluoroelastomer)
[2]Carbon black (available from Asahi Carbon)
[3]#150 (available from Kyowa Chemical)

What is claimed is:

1. In a fuel management system having at least one fluororubber article in contact with biodiesel fuel, the improvement wherein said fluororubber article comprises i) a polyhydroxy cured fluoroelastomer comprising copolymerized units of vinylidene fluoride and at least one other fluoromonomer and ii) 1 to 10 parts by weight, per hundred parts fluoroelastomer, of a diester of a dicarboxylic acid having the formula R(COOR')$_2$ wherein R is an alkylene group having 2 to 10 carbon atoms and R' is an alkyl group having 1 to 6 carbon atoms.

2. A fuel management system of claim 1 wherein said fluoroelastomer comprises copolymerized units of vinylidene fluoride and hexafluoropropylene.

3. A fuel management system of claim 2 wherein said fluoroelastomer further comprises copolymerized units of tetrafluoroethylene.

4. A fuel management system of claim 1 wherein said biodiesel fuel comprises a fatty acid alkyl ester of biological origin.

5. A fuel management system of claim 1 wherein said biodiesel fuel comprises a blend of a fatty acid alkyl ester of biological origin and petroleum diesel fuel.

6. A fuel management system of claim 1 wherein said diester of a dicarboxylic acid is selected from the group consisting of diisobutyl adipate, dimethyl adipate, diisobutyl pimelate, diisobutyl glutarate, di-n-butyl sebacate and mixtures thereof.

7. A fuel management system of claim 1 wherein said fuel management system is in a motor vehicle.

8. A fuel management system of claim 1 wherein said fuel management system is in a stationary diesel powered device.

9. A fuel management system of claim 1 wherein said fuel management system is in a biodiesel supply system.

10. A fuel management system of claim 1 wherein said fuel management system is in a biodiesel manufacturing plant.

11. A method for reducing the volume swell of a polyhydroxy cured fluororubber article in contact with biodiesel fuel wherein 1 to 10 parts by weight, per hundred parts by weight fluoroelastomer, of at least one diester of a dicarboxylic acid is incorporated into a polyhydroxy curable fluoroelastomer composition prior to curing said composition, said diester of a dicarboxylic acid having the formula R(COOR')$_2$ wherein R is an alkylene group having 2 to 10 carbon atoms and R' is an alkyl group having 1 to 6 carbon atoms.

12. A method according to claim 11 wherein said fluoroelastomer comprises copolymerized units of vinylidene fluoride and hexafluoropropylene.

13. A method according to claim 12 wherein said fluoroelastomer further comprises copolymerized units of tetrafluoroethylene.

14. A method according to claim 11 wherein said biodiesel fuel comprises a fatty acid alkyl ester of biological origin.

15. A method according to claim 11 wherein said biodiesel fuel comprises a blend of a fatty acid alkyl ester of biological origin and petroleum diesel fuel.

16. A method according to claim 11 wherein said diester of a dicarboxylic acid is selected from the group consisting of diisobutyl adipate, dimethyl adipate, diisobutyl pimelic pimelate, diisobutyl glutarate, di-n-butyl sebacate and mixtures thereof.

\* \* \* \* \*